(12) United States Patent
Tanaka

(10) Patent No.: US 7,982,887 B2
(45) Date of Patent: Jul. 19, 2011

(54) IMAGE FORMING DEVICE, IMAGE FORMING METHOD, IMAGE PROCESSING DEVICE, AND COMPUTER READABLE STORAGE MEDIUM STORING IMAGE FORMING PROGRAM

(75) Inventor: Yoshinori Tanaka, Tokyo (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1533 days.

(21) Appl. No.: 11/335,687

(22) Filed: Jan. 20, 2006

(65) Prior Publication Data
US 2007/0086036 A1    Apr. 19, 2007

(30) Foreign Application Priority Data

Oct. 14, 2005    (JP) .................................. 2005-300352

(51) Int. Cl.
  *G06F 15/00* (2006.01)
  *B41M 1/14* (2006.01)
(52) U.S. Cl. ...................................... 358/1.13; 101/211
(58) Field of Classification Search .................. 358/1.15, 358/1.13, 1.14, 1.16, 1.11, 1.12, 1.18, 462, 358/3.01, 534, 540, 1.9; 235/382, 375, 376, 235/492, 380; 709/221, 222; 382/199, 235, 382/248; 101/211, 484
See application file for complete search history.

(56) References Cited

U.S. PATENT DOCUMENTS

| | | | | |
|---|---|---|---|---|
| 6,304,336 | B1* | 10/2001 | Sugaya | 358/1.16 |
| 2002/0051167 | A1* | 5/2002 | Francis et al. | 358/1.14 |
| 2005/0190399 | A1* | 9/2005 | Nakaoka et al. | 358/1.15 |
| 2005/0280838 | A1* | 12/2005 | Kanai et al. | 358/1.1 |

FOREIGN PATENT DOCUMENTS

| | | |
|---|---|---|
| JP | 2001-249775 A | 9/2001 |
| JP | 2003-015846 A | 1/2003 |
| JP | 2004-320743 A | 11/2004 |
| JP | 2005-020101 A | 1/2005 |
| JP | 2005-129011 A | 5/2005 |
| JP | 2006-088340 A | 4/2006 |

OTHER PUBLICATIONS

Japanese Office Action dated May 8, 2007 (with English translation).

* cited by examiner

*Primary Examiner* — Saeid Ebrahimi Dehkordy
(74) *Attorney, Agent, or Firm* — Buchanan Ingersoll & Rooney PC

(57) ABSTRACT

Disclosed is an image forming device including a connecting unit for connecting a recording medium in a removable manner; and a writing unit for writing printing data containing setup information concerning a printing condition into the recording medium connected to the connecting unit.

16 Claims, 17 Drawing Sheets

700

IMAGE FORMING DEVICE, IMAGE FORMING METHOD, IMAGE PROCESSING DEVICE, AND COMPUTER READABLE STORAGE MEDIUM STORING IMAGE FORMING PROGRAM

CROSS-REFERENCE TO RELATED APPLICATION

This application is based on Japanese Patent Application No. 2005-300352, filed on Oct. 14, 2005, the contents of which are hereby relied on to correct possible errors in the present application.

BACKGROUND OF THE INVENTION

1. Field of the Invention

The invention relates to an image forming device, an image forming method, an image processing device, and a computer readable storage medium storing an image forming program.

2. Description of the Related Art

There exist today image forming devices that are capable of storing printing data internally after printing is completed and call out the same printing data again in response to users' requests in order to print on paper.

However, if a user wants to print the same document file on a different image forming device with the same printing condition, the user had to initiate the application program on a PC (personal computer) again, use the printer driver to generate printing data, and transmit the particular printing data to the other image forming device. This makes the process more complicated and tends to cause errors in setting up the printing condition.

On the other hand, a printer capable of printing image data stored in another printer which is connected to the first printer via a network, by receiving the data via the network, is described in Unexamined Japanese Patent Publication No. JP-A-2004-320743.

However, the printer described in the abovementioned patent document is not capable of printing image data by receiving it from another printer which is not connected to the first printer via a network. Moreover, there is a need for setting up a printing condition to print.

OBJECTS AND SUMMARY

It is an object of the present invention to provide an image forming device, an image forming method, an image processing device, and a computer readable storage medium storing an image forming program all improved to solve the abovementioned problems.

It is another object of the present invention to provide an image forming device, an image forming method, an image processing device, and a computer readable storage medium storing an image forming program capable of transferring printing data to the image forming device and easily executing a printing process regardless of whether or not the image forming device and the device where the data is stored are connected via a network.

It is still another object of the present invention to provide an image forming device, an image forming method, an image processing device, and a computer readable storage medium storing an image forming program capable of easily executing a printing process without having to set up a printing condition in transferring printing data to the image forming device.

According to an embodiment of the invention, there is provided an image forming device, comprising: a connecting unit for connecting a recording medium in a removable manner; and a writing unit for writing printing data containing setup information concerning a printing condition into said recording medium connected to said connecting unit.

According to another embodiment of the invention, there is provided an image forming method comprising the steps of: 1) generating printing data containing setup information concerning a printing condition; and 2) writing said printing data into a recording medium connected in a removable manner to a connecting unit provided in an image forming device.

According to still another embodiment of the invention, there is provided a computer readable storage medium stored with an image forming program, wherein said image forming program causes an image forming device to execute a process comprising the steps of: writing printing data containing setup information concerning a printing condition into a recording medium connected to a connecting unit provided on said image forming device.

According to a further embodiment of the invention, there is provided an image forming method comprising the steps of: 1) reading out printing data, which is data obtained after analyzing Page Description Language (PDL) data stored in a recording medium connected in a removable manner to a connecting unit provided on an image forming device, and contains data described in an intermediate language before it is developed into bitmap data; and 2) executing a printing process based on the printing data read during said reading step.

According to a still further embodiment of the invention, there is provided a computer readable storage medium stored with an image forming program, wherein said image forming program causes an image forming device to execute a process comprising the steps of: 1) reading out printing data, which is recorded in a recording medium connected in a removable manner to a connecting unit provided on said image forming device, obtained after analyzing Page Description Language (PDL) data, and contains data described in an intermediate language before the data is developed into bitmap data; and 2) executing a printing process based on the printing data read during said reading step.

According to a yet further embodiment of the invention, there is provided an image processing device, comprising: a connecting unit for connecting a recording medium in a removable manner; and a writing unit for writing printing data, which is data obtained after analyzing Page Description Language (PDL) data and contains data described in an intermediate language before the data is developed into bit map data, into said recording medium connected to said connecting unit.

According to a yet further embodiment of the invention, there is provided an image processing device, comprising:

a connecting unit for connecting a recording medium in a removable manner; a reading unit for reading out printing data, which is recorded in said recording medium connected to said connecting unit, obtained after analyzing Page Description Language (PDL) data, and contains data described in an intermediate language before the data is developed into bitmap data; and a printing unit for executing a printing process based on the printing data read by said reading unit.

In all of the above cases, the storage medium means a portable storage medium, typically a USB (Universal Serial Bus) memory, a Compact Flash memory, an SD Card memory, etc. The portable storage medium can be any portable terminal device such as an information portable terminal and a cellular phone equipped with a built-in or externally attached storage medium.

Also, the connecting unit for connecting the storage medium in a removable manner is typically an interface that corresponds to each of the abovementioned storage media. Such a connecting unit is equipped with a terminal from which the storage medium can be electrically or physically removable. The connection unit of the invention can be an interface that can be removable not physically but in a communication manner, such as an infrared rays interface.

The objects, characteristics and properties of this invention other than those set forth above will become apparent from the description given herein below with reference to preferred embodiments illustrated in the accompanying drawings.

DETAILED DESCRIPTION OF PREFERRED EMBODIMENTS

The embodiments of this invention will be described below with reference to the accompanying drawings.

Although examples of realizing the constitution and process according to the present invention by a printer and realizing the portable recording medium by a USB memory are described below as optimum embodiments, the invention shall not be limited by these embodiments.

Figure 1:
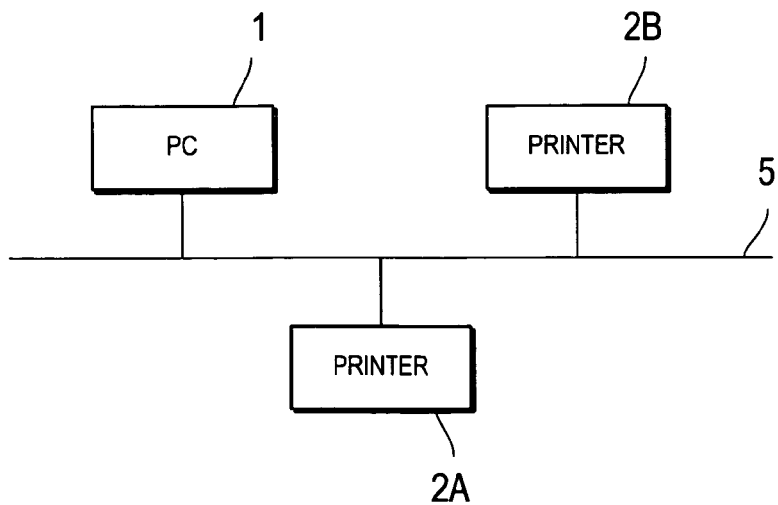
FIG. 1 is a block diagram showing the overall constitution of a printing system according to a first embodiment of the present invention.

FIG. 1 is a block diagram showing the overall constitution of a printing system according to a first embodiment of the present invention.

The image processing system according to this embodiment is equipped with a PC (personal computer) 1 and printers 2A and 2B as image forming devices, which are connected via a network 5 to communicate with each other.

The network 5 consists of various networks such as a LAN connecting computers and network equipment according to standards such as Ethernet®, Token Ring, and FDDI, or a WAN that consists of several LANs connected by a dedicated line. The types and the number of equipment to be connected to the network 5 are not limited to those shown in FIG. 1.

Figure 2:
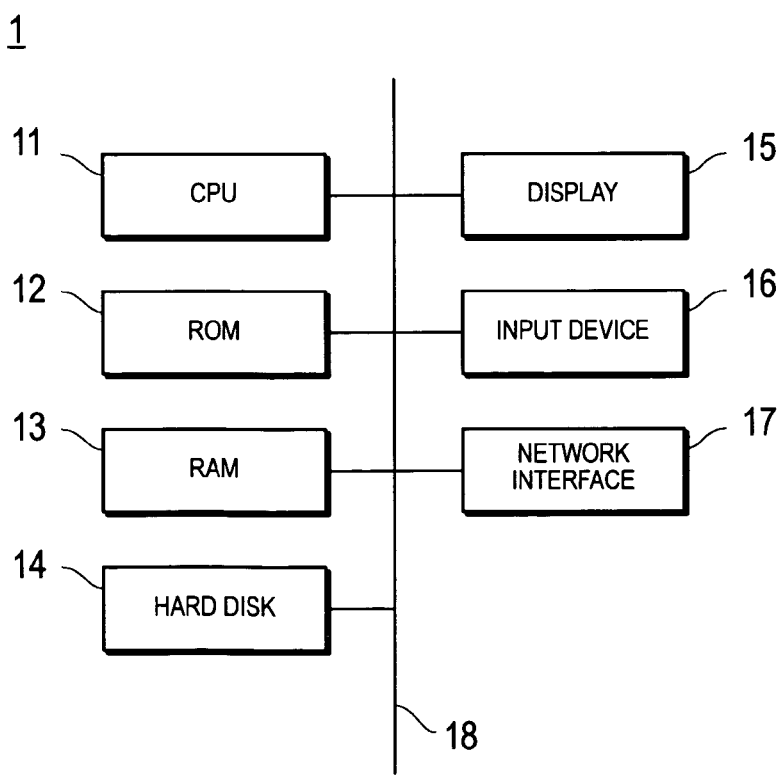
FIG. 2 is a block diagram showing the constitution of the PC shown in FIG. 1.

FIG. 2 is a block diagram showing the constitution of the PC shown in FIG. 1. The PC 1 contains a CPU 11, a ROM 12, a RAM 13, a hard disk 14, a display 15, an input device 16 and a network interface 17, all of which are interconnected by a bus 18 for exchanging signals.

The CPU 11 controls various parts indicated above and executes various arithmetic processes according to a program. The ROM 12 stores various programs and data. The RAM 13 stores programs and data temporarily as a working area. The hard disk 14 stores various programs including an operating system and data.

An application program for generating document files and a printer driver for converting the document files into printing data of a format understood by the printer are installed in the hard disk 14. The printing data of the format the printer can understand is PDL data described in a Page Description Language (PDL) such as Postscript®.

The display 15 displays various kinds of information. The input device 16 consists of pointing devices such as a mouse, a keyboard, and others, and is used for making various kinds of inputs. The network interface 17 is an interface for communicating with other devices on the network via the network 5 using standards such as Ethernet®, Token Ring, FDDI, etc.

Figure 3:
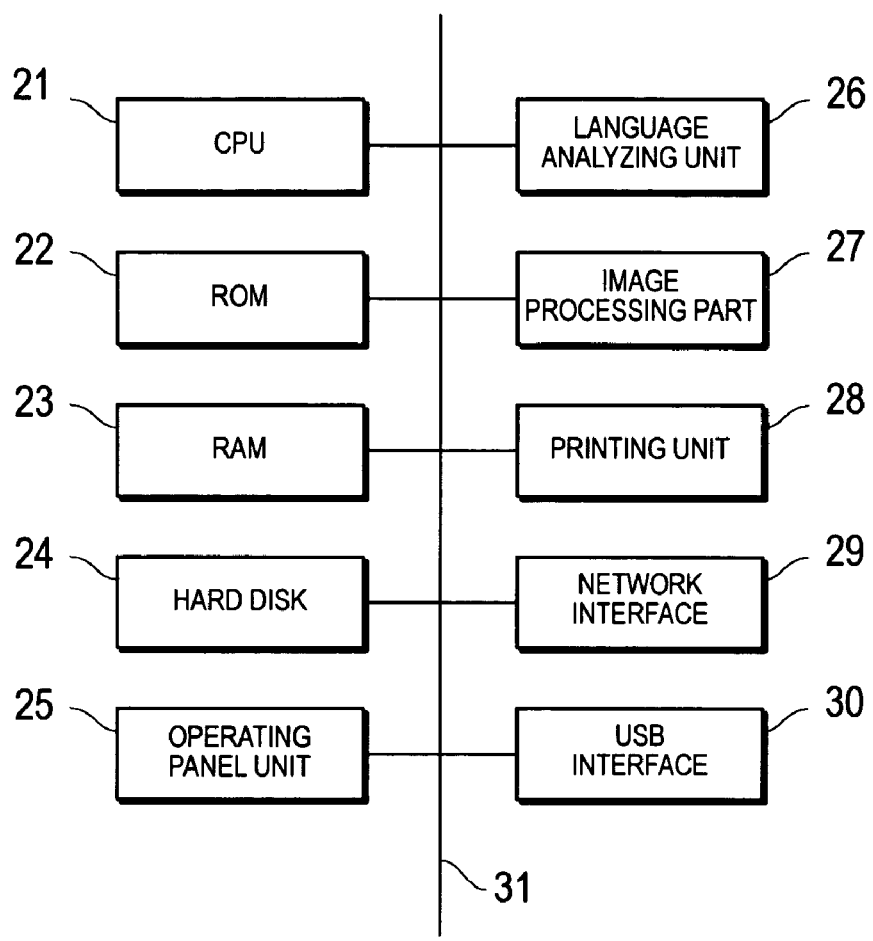
FIG. 3 is a block diagram showing the constitution of the printer shown in FIG. 1.

FIG. 3 is a block diagram showing the constitution of the printer shown in FIG. 1. The printers 2A and 2B each has a CPU 21, a ROM 22, a RAM 23, a hard disk 24, an operating panel 25, a language analysis unit 26, an image processing unit 27, a printing unit 28, a network interface 29, and a USB (Universal Serial Bus) interface 30, all of which are interconnected with each other via a bus 31 for exchanging signals. The descriptions of those parts of the printers 2A and 2B that have the same functions as those of the corresponding parts of the PC 1 will be omitted here to avoid being duplicative.

The operating panel unit 25 is equipped with a touch panel, a ten-key pad, a start button, a stop button and others to be used for displaying various information and entering various instructions.

The language analysis unit 26 analyzes the printing data (PDL data) received from equipment such as PC 1 via the network interface 29 to prepare intermediate data. The intermediate data is the data obtained after analyzing the PDL data and the data described by the intermediate language before it is developed into bitmap data. The image processing unit 27 changes the intermediate data prepared by the language analysis 26 into bitmap data that can be printed by the printing unit 28. The printing unit 28 prints the bitmap data prepared by the image processing unit 27 using a known image generating process such as an electronic photograph type process on a recording medium such as paper.

Figure 4:
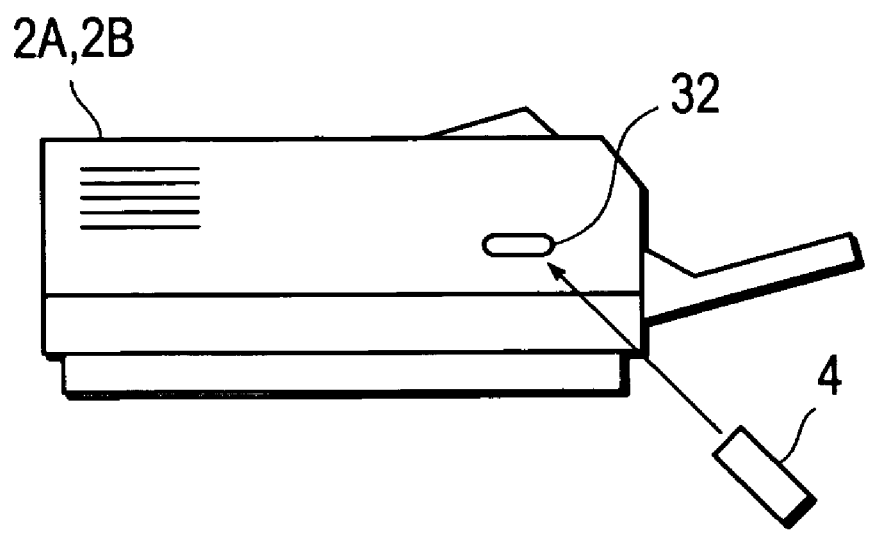
FIG. 4 is a diagram showing how the USB memory is connected to the USB port of the printer.

The USB interface 30 is an interface for connecting with equipment that conforms with the USB standard such as the USB memory 4 (see FIG. 4). The USB memory 4 contains a non-volatile memory and a terminal that connects with the particular non-volatile memory. As shown in FIG. 4, the USB interface 30 includes a USB port 32 for connecting in a removable manner the terminal for the USB memory 4 to make its contents accessible.

The PC 1 and the printers 2A and 2B can each contain constituent elements other than those described above, or may lack a portion of the abovementioned elements.

The operation of the printing system in this embodiment will be described in the following. In this embodiment, the printing data prepared in the PC 1 is transmitted to the printer 2A, and the printing data is written into the USB memory 4 in the printer 2A. As the particular USB memory 4 is removed from the printer 2A, it is connected to the printer 2B located in a different place and the printing process is executed on the printer 2B based on the printing data stored in the USB memory 4.

Figure 5:
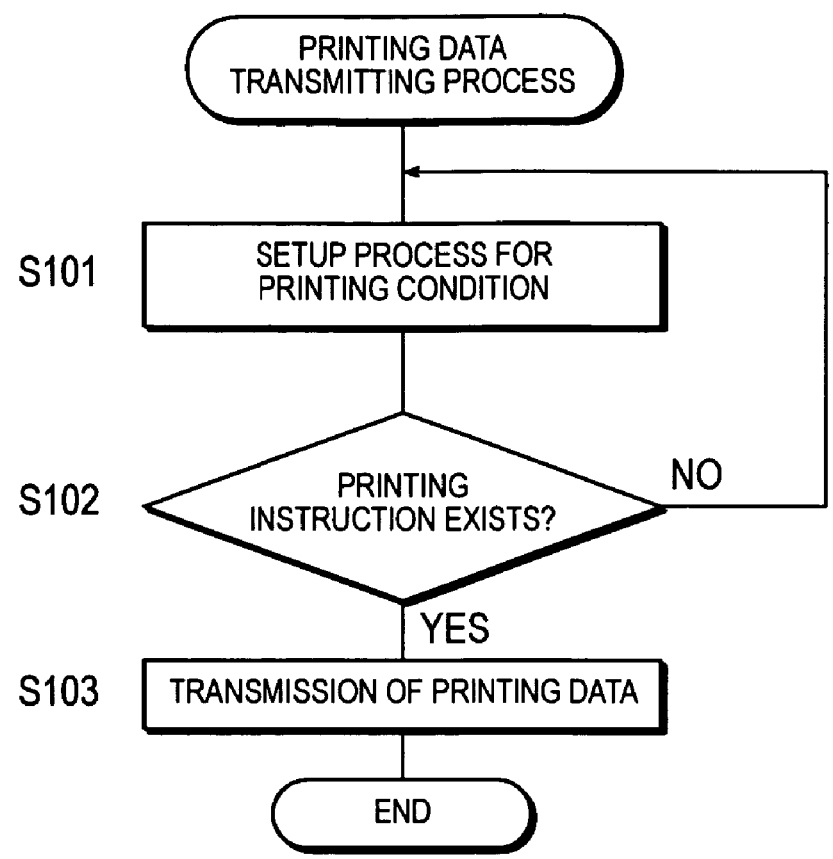
FIG. 5 is a flowchart showing the sequence of the transmission process for the printing data in the PC.

FIG. 5 is a flowchart showing the sequence of the transmission process for the printing data in the PC 1. The algorithm shown in the flowchart of FIG. 5 is stored as a program in a memory unit such as a hard disk 14 of PC 1 and executed by CPU 11.

In printing a document file prepared using the application program, the printing condition setup process is executed, first of all, based on the user's operation (S101). The printing condition setup process is done by using the printing condition setup screen displayed by the printer driver on the display 15.

Figure 6:
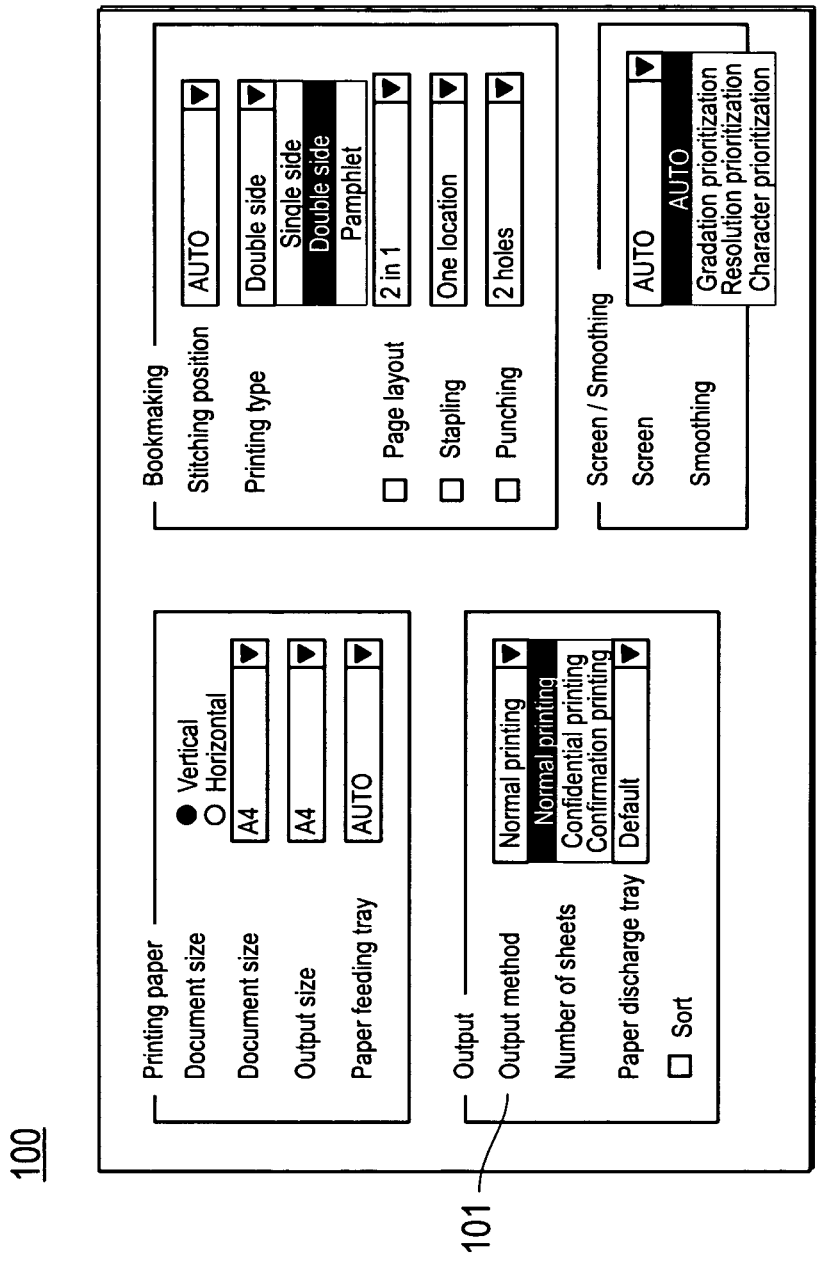
FIG. 6 shows an example of a printing setup screen.

FIG. 6 shows an example of a printing setup screen. Various items such as a document size, an output method (e.g., "confidential printing"), the number of copies, a selection whether or not to be sorted, a type of printing (e.g., "double sided"), and screen processing (e.g., "gradation preference") are set up on the printing setup screen 100.

Figure 7:
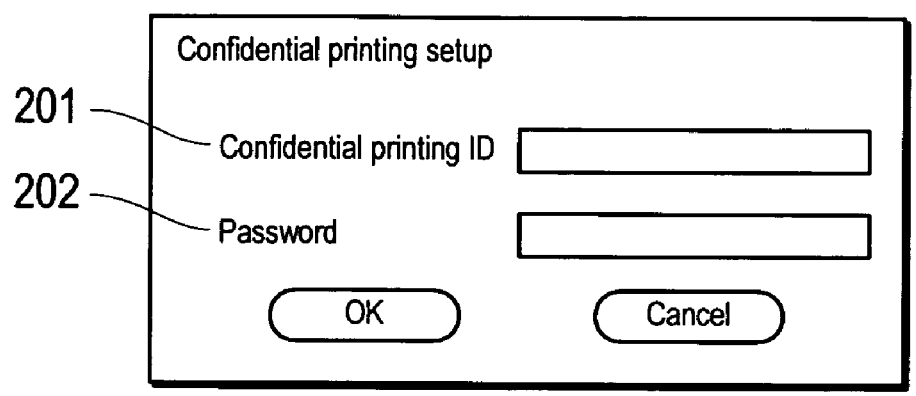
FIG. 7 shows an example of a confidential printing setup screen.

If "Confidential Printing" is selected in an output method 101 of the printing setup screen 100, a confidential printing setup screen 200 will be displayed on the display 15 as shown in FIG. 7. The confidential printing setup screen 200 includes the input box 201 and 202 for entering the ID and password required for printing, etc. The "confidential printing" here means a printing method in which a printing process is allowed only when the specified ID and password are entered into the printer.

Next, the PC 1 will stand by until it receives an instruction for printing based on the user's operation (S102: No). Upon receiving a printing instruction (S102: Yes), printing data is prepared by means of the application program based on the specified document file, and the particular printing data is transmitted to the printer 2A (S103). The printing data prepared here is PDL data. The setup information concerning the printing condition set up on the setup screen shown in FIG. 6 and FIG. 7 is added to the printing data using PJL (Printer Job Language) or PDL.

Figure 8:
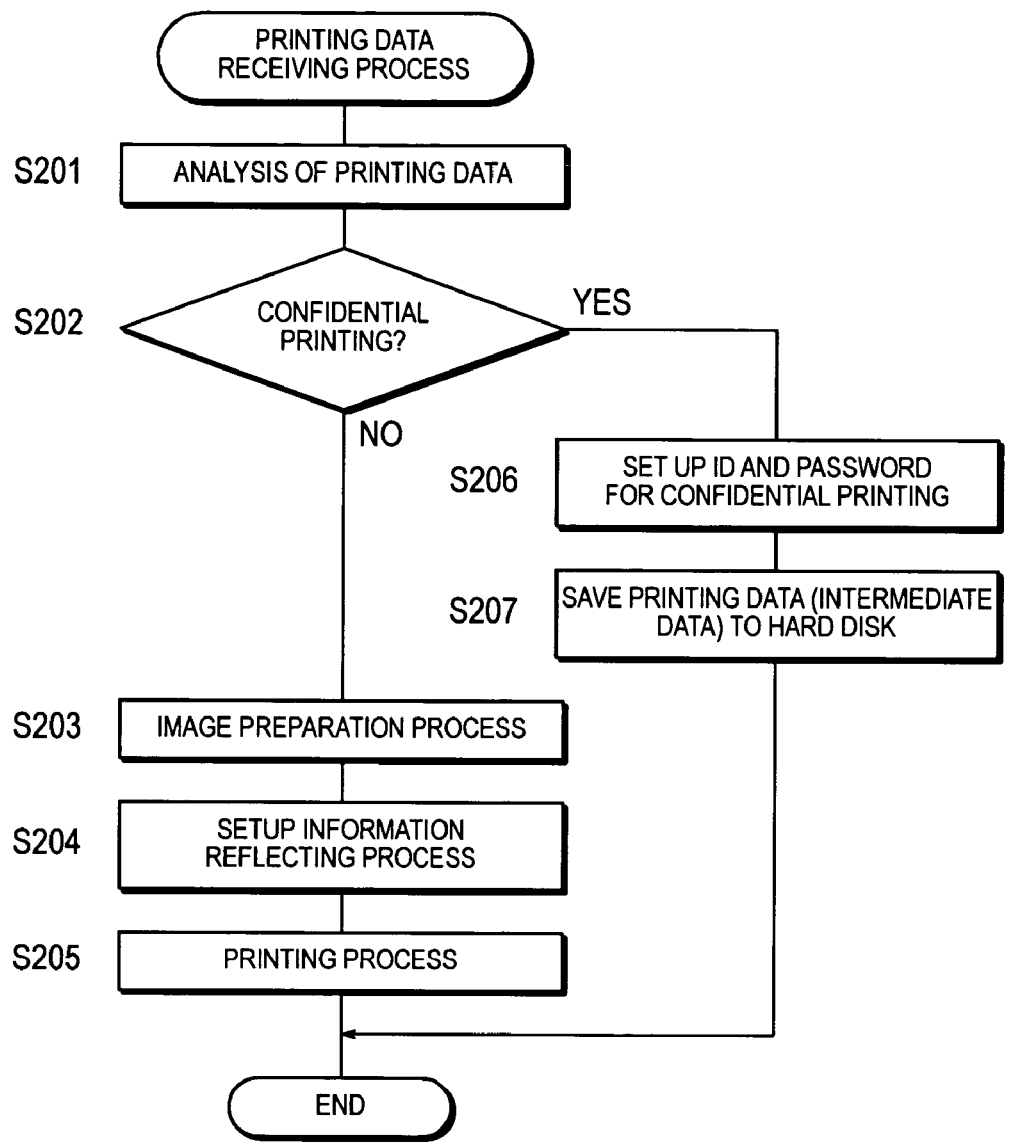
FIG. 8 is a flowchart showing the sequence of the receiving process for the printing data in the printer 2A.

FIG. 8 is a flowchart showing the sequence of the receiving process for the printing data in the printer 2A. The algorithm shown in the flowchart of FIG. 8 is stored as a program in a memory unit such as a hard disk 24 of the printer 2A and executed by the CPU 21.

Upon receiving the printing data (PDL data) from the PC 1, the language analysis unit 26 analyzes the printing data (S201). The intermediate data is generated by analyzing the PDL data at this point.

Next, a judgment is made as to whether the received printing data relates to the "confidential printing" or not (S202). This judgment is executed based on the setup information concerning the printing condition contained in the printing data.

If the received printing data is not related to the "confidential printing" (S202: No), the image preparation process is executed (S203). In other words, the intermediate data is generated by the language analysis unit 26, and is stored into the hard disk 24 as the printing data together with the setup information. The intermediate data thus prepared is converted into bitmap data by the image processing unit 27. Next, the setup process is executed in order to reflect the setup information contained in the printing data on the printing process (S204). The printing process is then executed based on the printing data (S205). In other words, the bit map data will be printed on the paper by the printing unit 28.

On the other hand, if the received data is related to the "confidential printing" (S202: Yes), the ID and password to be used in printing and others are set up based on the setup information contained in the printing data (S206).

Next, the printing data, which is the intermediate data now added with the setup information containing the ID and password, is stored into the hard disk 24 (S207).

Figure 9:
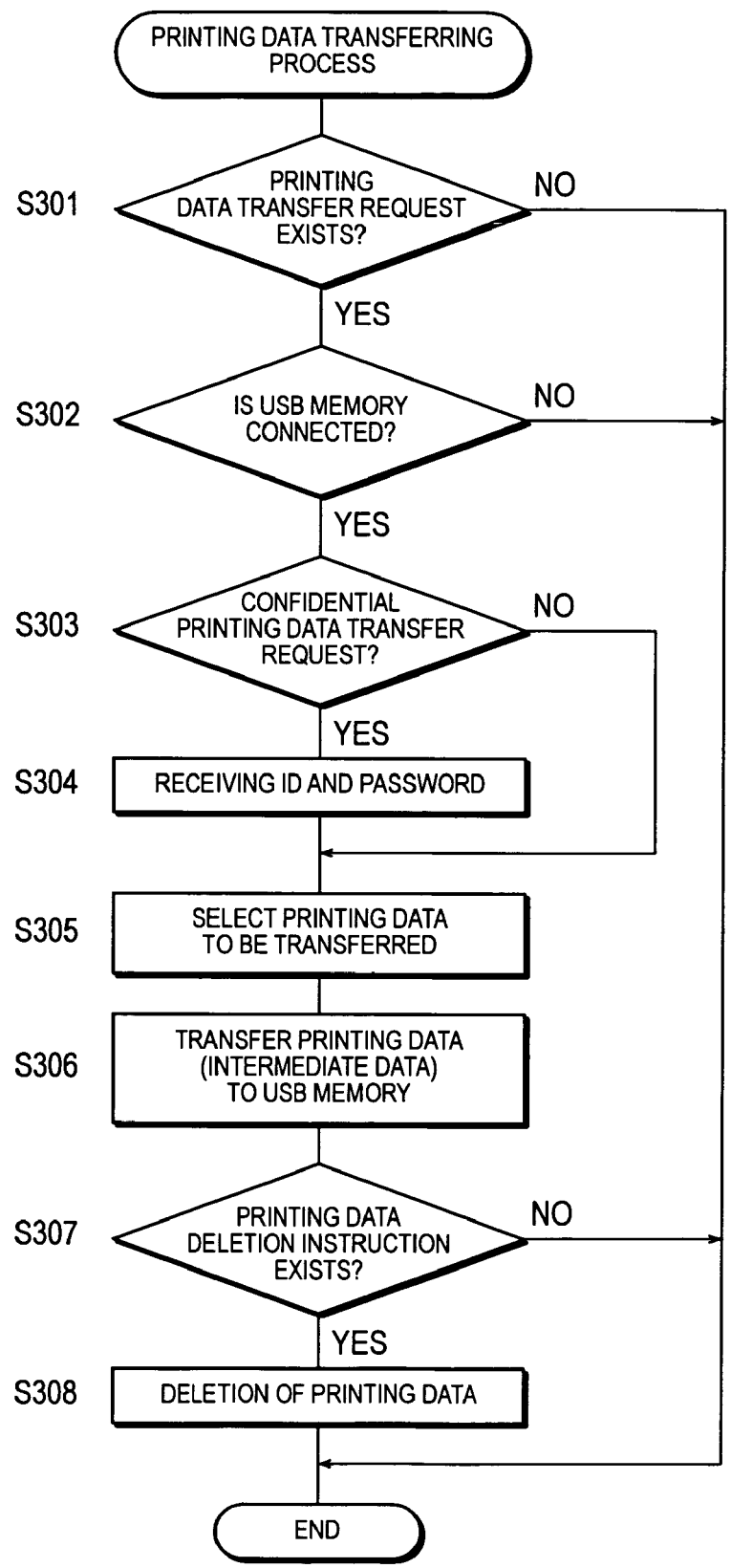
FIG. 9 is a flowchart showing the sequence for the transferring process for the printing data in the printer 2A.

Next, the process of the transferring process in the printer 2A will be described below with reference to FIG. 9. The algorithm shown in the flowchart of FIG. 9 is stored as a program in a memory unit such as a hard disk 24 of the printer 2A and executed by the CPU 21.

First, a judgment is made as to whether there is a request for transferring the printing data to the USB memory 4 by the user's operation through the operating panel unit 25 (S301).

If there is a request for transferring the printing data (S301: Yes), a confirmation is made as to whether the USB memory 4 is connected to the USB port 32 or not (S302). If the USB memory 4 is not connected (S302: No), the process of FIG. 9 is completed. At this time, a message reporting that the USB memory 4 is not connected is displayed on the operating panel unit 25.

If the USB memory 4 is connected (S302: Yes), a judgment is made as to whether the object of transfer request is confidential printing data or not (S303). If the object of the transfer request is not confidential printing data (S303: No), the program advances to the step S305.

Figure 10:
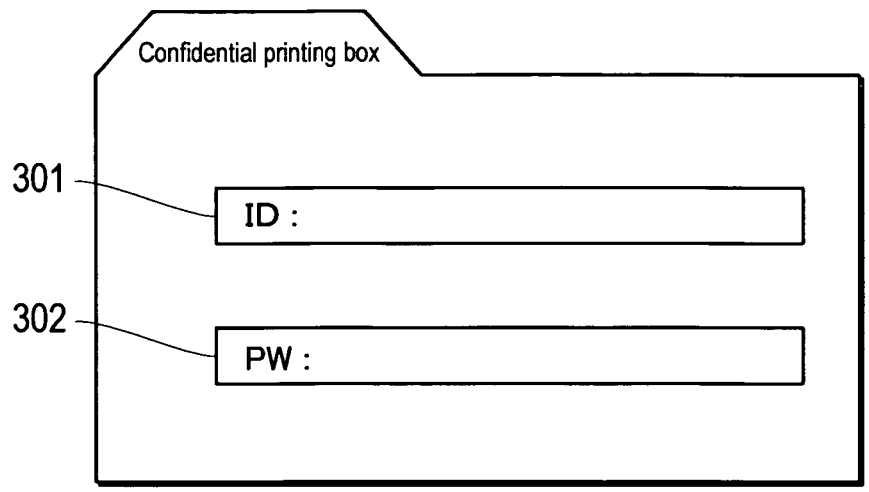
FIG. 10 shows an example of a confidential printing input screen.

If the object of the transfer request is confidential printing data (S303: Yes), the ID and password for confidential printing are accepted by the user's operation through the operating panel unit 25 (S304). This causes a confidential printing input screen 300 as shown in FIG. 10 to be displayed on the operating panel unit 25. The confidential printing setup screen 300 includes the input box 301 and 302 for entering the ID and password used for confirming by the user.

Figure 11:
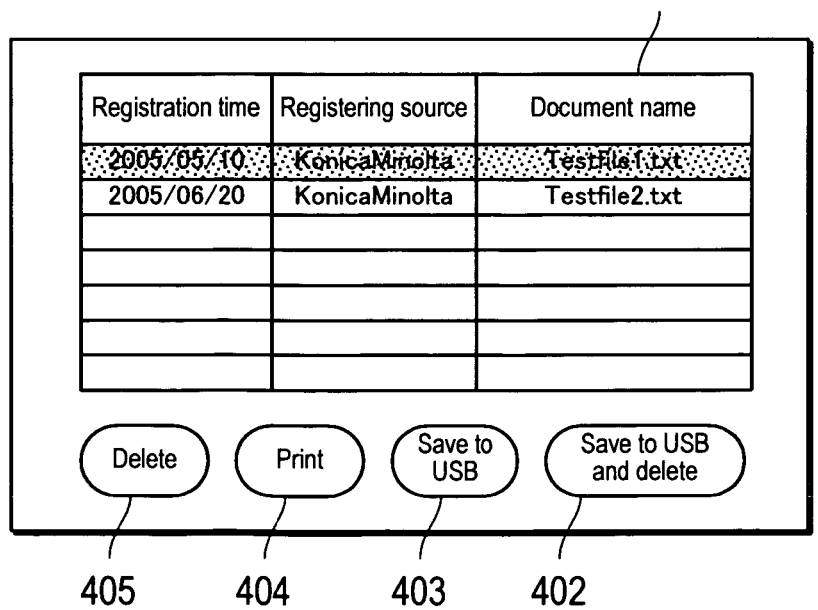
FIG. 11 shows an example of a printing data selection screen.

In the step S305, the printing data to be transferred is selected by the user's operation through the operation panel unit 25. This causes a printing data selection screen 400 as shown in FIG. 11 to be displayed on the operating panel unit 25. The printing data selection screen 400 contains a selection part 401 that selectively displays job information of the printing data stored in the hard disk 24 of the printer 2A. If the object of the transfer request is confidential printing data, the job information of the confidential printing data stored in the confidential printing data storage area that corresponds to the specified ID in the hard disk 24 of the printer 2A is displayed. The printing data to be transferred is selected as the user operates the display area of the job information of the printing data in the selection part 401 the user wishes to transfer.

The printing data selection screen 400 contains a "Store to USB and Delete" button 402 and a "Store to USB" button 403. When one of these buttons is pressed, the selection of the printing data to be transferred is completed. If the user wants to delete the printing data from the printer 2A, the user presses the "Store to USB and Delete" button 402, while if the user wants to leave the printing data in the printer 2A, the user presses the "Store to USB" button 403. The number "404" shown in the diagram denotes a button for instructing printing the selected printing data with the particular printer 2A, while the number "405" denotes deletion of the selected printing of data from the particular printer 2A.

Next, the selected printing data is transferred from the hard disk 24 to the USB memory 4 (S306). In other words, the selected printing data residing in the printer 2A is written into the USB memory 4.

Next, a judgment is made as to whether an instruction for deleting the printing data to be transferred from the printer 2A exists or not (S307). In other words, a judgment is made whether the "Store to USB and Delete" button 402 or the "Store to USB" button 403 is pressed.

If it is judged that an instruction for deleting the printing data to be transferred from the printer 2A exists (S307: Yes), in other words, if it is judged that the "Store to USB and Delete" button 402 is pressed, the printing data selected for transfer is deleted from the printer 2A (S308). This prevents the printing data (intermediate data) from remaining in the printer 2A, so that it is preferable from the security standpoint.

On the other hand, if it is judged that there is no instruction to delete the printing data to be transferred from the printer 2A (S307: No), in other words, if it is judged that the "Store to USB" button 403 is pressed, the process of FIG. 9 is terminated.

Next, the operation of the printer 2B will be described below for a case when the USB memory 4 storing the printing data is removed from the printer 2A and the particular USB memory 4 is connected to the printer 2B located in another place.

Figure 12:
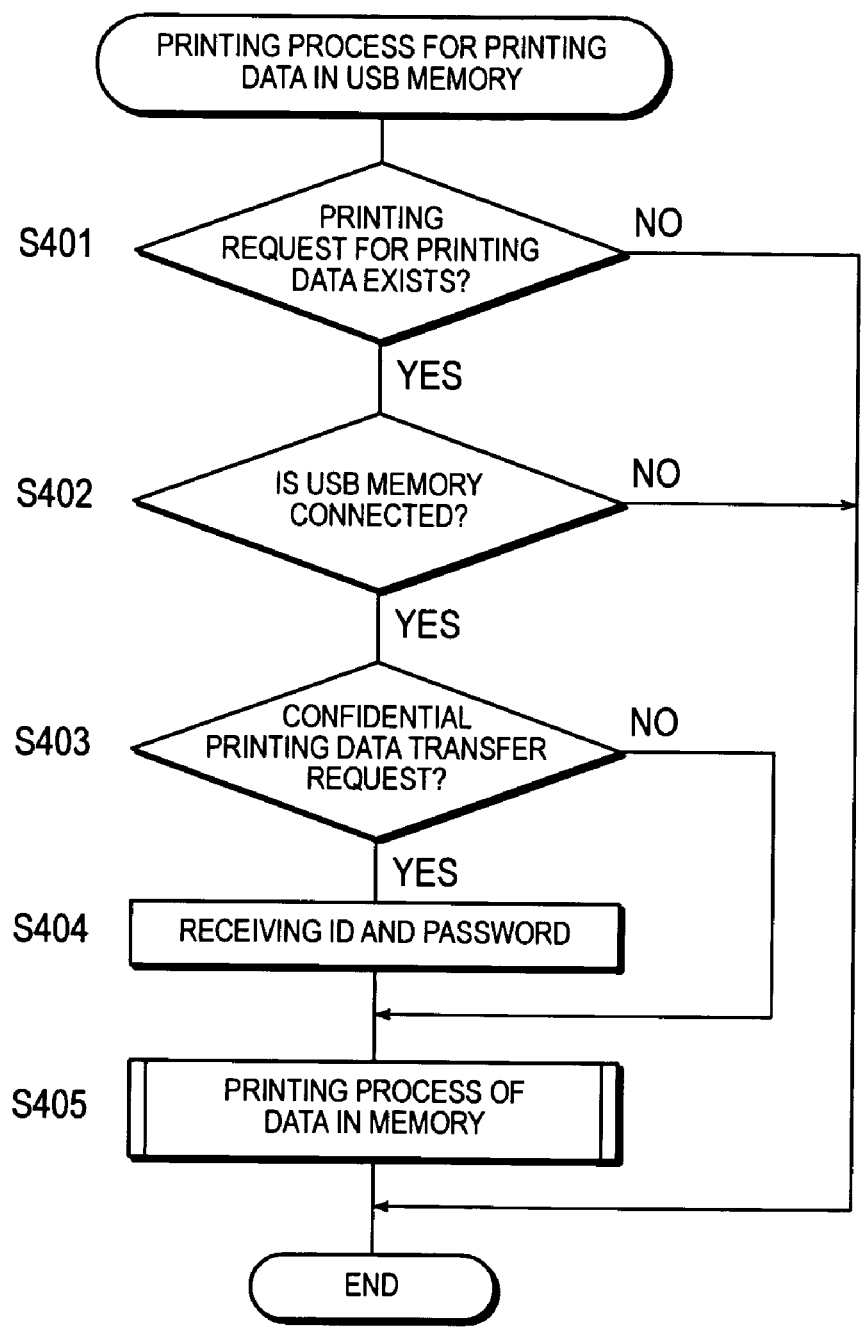
FIG. 12 is a flowchart showing the sequence of the printing process for the printing data in the USB memory of the printer 2B.
Figure 13:
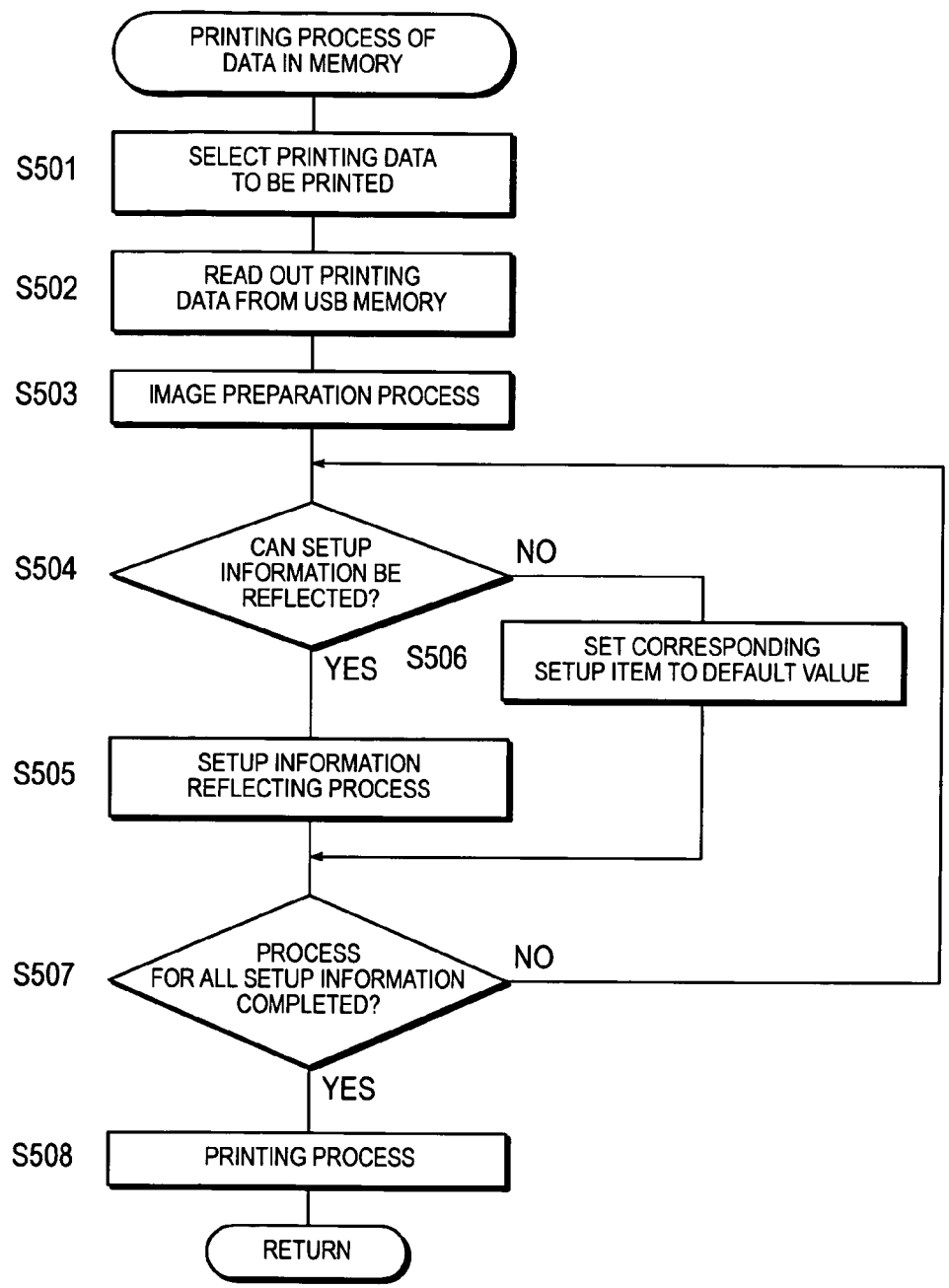
FIG. 13 is a flowchart showing the sequence of the printing process for the data inside the memory.

FIG. 12 and FIG. 13 are both flowcharts showing the sequence of the printing process for the printing data in the USB memory of the printer 2B. The algorithm shown in the flowchart of FIG. 12 and FIG. 13 is stored as a program in a memory unit such as the hard disk 24 of the printer 2B and executed by the CPU 21.

First, a judgment is made as to whether or not there was a request for printing the printing data in the USB memory 4 by the user's operation through the operating panel unit 25 (S401).

If there is a request for printing the printing data (S401: Yes), a confirmation is made as to whether the USB memory 4 is connected to the USB port 32 or not (S402). If the USB memory 4 is not connected (S402: No), the process of FIG. 12 is completed. At this time, a message reporting that the USB memory 4 is not connected is displayed on the operating panel unit 25.

Next, a judgment is made as to whether the object of the printing request is a confidential printing data or not (S403). If the object of the printing request is not confidential printing data (S403: No), the program advances to the step S405.

Figure 14:
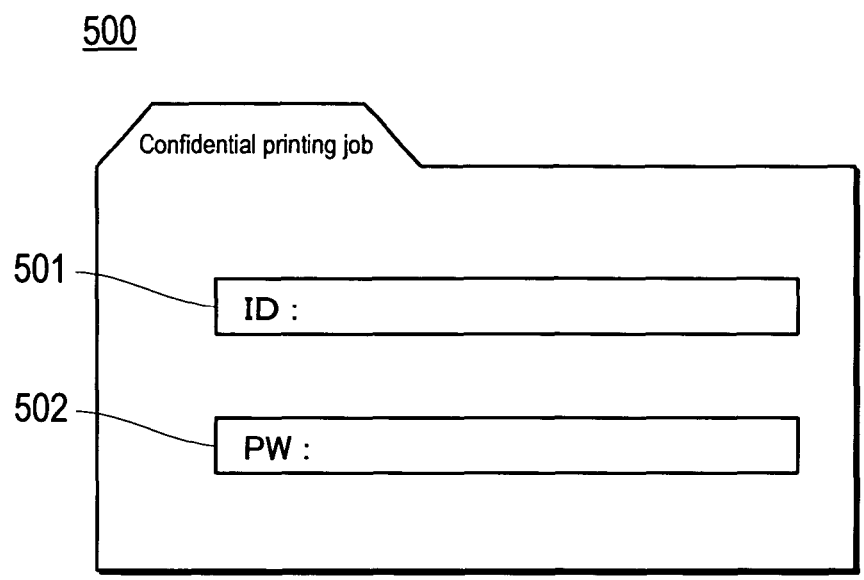
FIG. 14 shows an example of a confidential printing input screen.

If the object of the transfer request is confidential printing data (S403: Yes), the ID and password for confidential printing are accepted by the user's operation through the operating panel unit 25 (S404). This causes a confidential printing input screen 500 as shown in FIG. 14 to be displayed on the operating panel unit 25. The confidential printing setup screen 500 includes the input box 501 and 502 for entering the ID and password used for confirming by the user.

In the step S405, the printing process of the data in the memory is executed.

Next, the printing process of the data in the memory in the step S405 will be described below with reference to FIG. 13.

Figure 15:
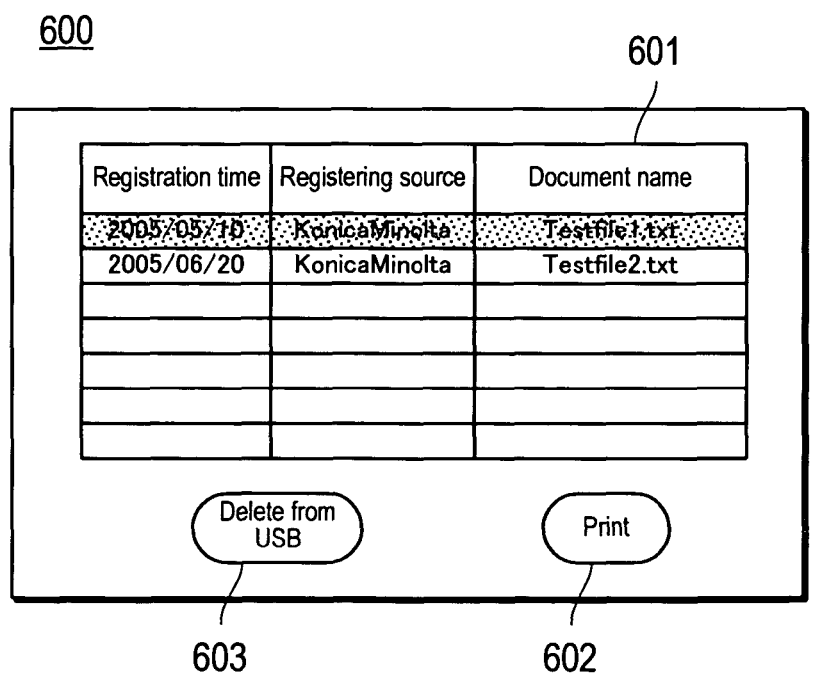
FIG. 15 shows an example of a printing data selection screen.

First, the printing data to be printed is selected by the user's operation through the operation panel unit 25 (S501). This causes a confidential printing input screen 600 as shown in FIG. 15 to be displayed on the operating panel unit 25. The printing data selection screen 600 contains a selection part 601 that selectively displays job information of the printing data (intermediate data) stored in the USB memory 4. If the object of the transfer request is confidential printing data, the job information of the confidential printing data is stored in the confidential printing data storage area that corresponds to the specified ID in the USB memory 4. The printing data to be printed is selected as the user operates the display area of the job information of the printing data in the selection part 601 the user wishes to print.

The printing data selection screen 600 contains a "print" button 602. When the "print" button 602 is pressed, the selection of the printing data to be printed is completed. The number "603" in the diagram denotes the button for instructing the deletion of the selected printing data from the USB memory 4.

Next, the selected printing data is read out to a RAM 23 of the printer 2B from the USB memory 4 (S502).

Then, the image preparation process will be performed (S503). The printing data (intermediate data) read out to the RAM 23 is converted to bitmap data by the image processing unit 27. The printing data (intermediate data) read out by the RAM 23 can be constituted to be stored in the hard disk 24.

In the step S504, a judgment is made as to whether or not the setup information contained in the printing data can be reflected on the printing process in the printer 2B. For example, a judgment is made as to whether stapling, punching or a similar process can be specified for the particular printer 2B. If the setup information contained in the printing data can be reflected on the printing process (S504: Yes), a setup process is performed in order to reflect the particular setup information on the printing process in the printer 2B (S505).

On the other hand, if the setup information contained in the printing data cannot be reflected on the printing process (S504: No), the value of the item that corresponds to the setup information that cannot be reflected on the printing process is set up as the default value of the printer 2B. This prevents a job from being cancelled by an error in the setup of the printing condition.

In the step S507, a judgment is made as to whether the process is finished for all the setup information contained in the printing data. If the process is not finished for all the setup information (S507: No), the program returns to the step S504.

If the process for all the setup information is completed (S507: Yes), the printing process is executed based on the printing data (S508). In other words, the bit map data will be printed on the paper by the printing unit 28.

Thus, in this embodiment, the printing data containing the setup information concerning the printing condition is written into the USB memory connected in a removable manner to the USB port provided on the printer.

Therefore, it is possible to transfer printing data using the USB memory from one image forming device such as a printer to another image forming device such as a printer regardless of whether they are connected via a network or not, and to execute the printing process easily without setting the printing condition.

The user can store in the USB memory and carry the printing data containing the setup information concerning the printing condition, which can be considered equivalent to a printed material, without having to carry the printed material itself. This prevents the contents of the printed material from being exposed to the eyes of others so that it is more desirable from the standpoint of security.

Also, printing data is stored as intermediate data in a recording medium such as a USB memory. This makes it possible to store a particular set of printing data in a smaller capacity than when it is stored in the form of bitmap data. Moreover, since intermediate data is data obtained as a result of language analysis of PDL data, so that the processing time during printing is shorter than doing it based on PDL data. Furthermore, intermediate data is more advantageous from the standpoint of security since its format varies among different manufacturers, which makes it more difficult to check the contents of data among different equipment and PCs.

Next, the second embodiment of the invention will be described below.

The first embodiment described above and second embodiment are different from each other in that printing data (intermediate data) is first stored on the hard disk 24 of the printer 2A in the former, while printing data (intermediate data) is written into the USB memory 4 without being stored in the printer 2A in the latter. The following description will concentrate mainly on those points that are different from the first embodiment.

Figure 16:
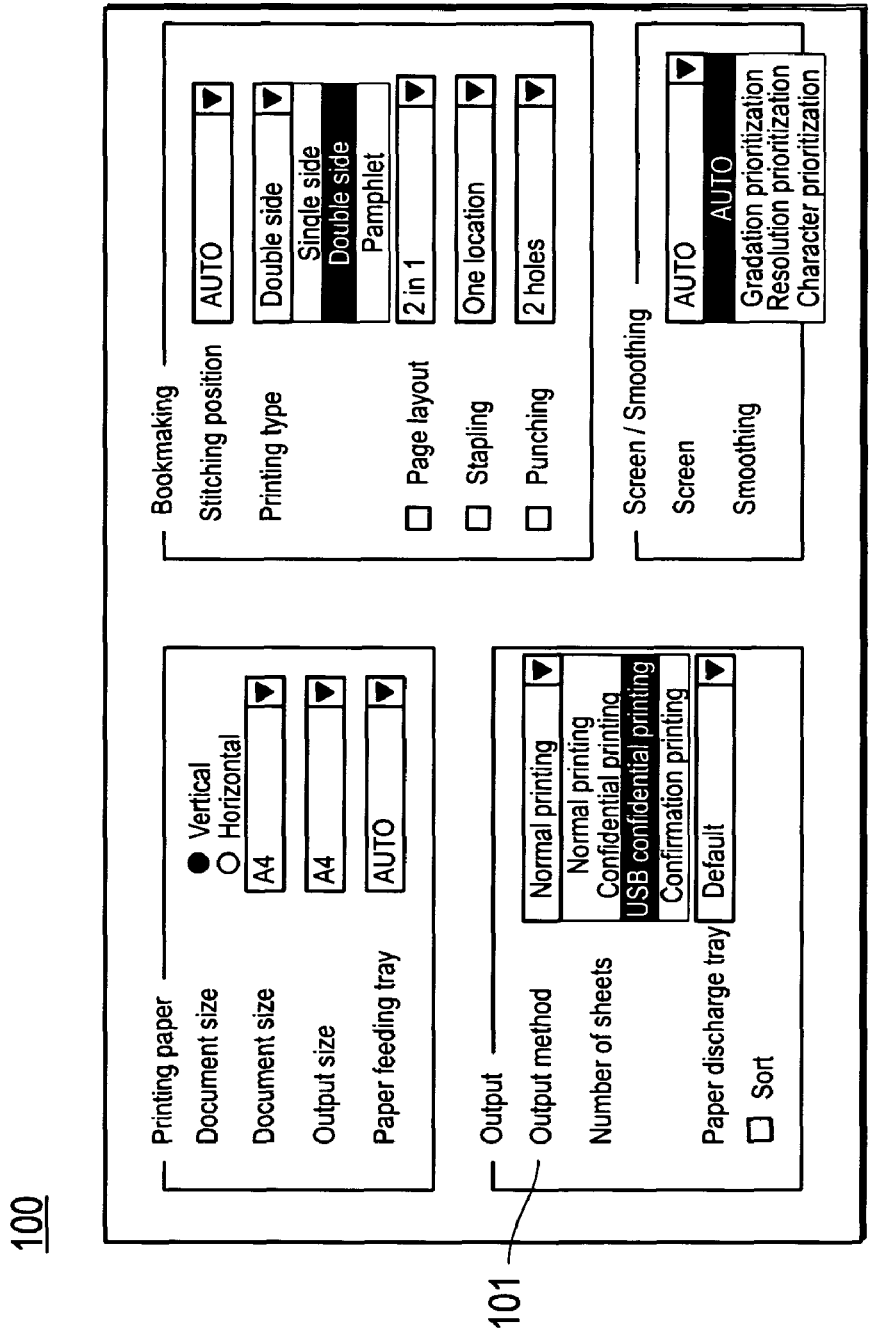
FIG. 16 shows an example of a printing setup screen for a second embodiment of the present invention.

The flowchart showing the sequence of the transmission process for the printing data in the PC 1 is identical to the flowchart shown in FIG. 5. However, the setup process of the printing condition is performed using the printing setup screen 100*a* shown in FIG. 16. As shown in FIG. 16, "USB Confidential Printing" can be selected in the item 101 of the output method of the printing setup screen 100*a* as shown in FIG. 16. The "USB confidential printing" is a printing method in which a printer which received PDL data writes intermediate data based on the received PDL data into the USB memory without storing it in its own printer, and the execution of the printing process based on the intermediate data in the USB memory is allowed only when the specified ID and password are entered into the printer.

Figure 17:
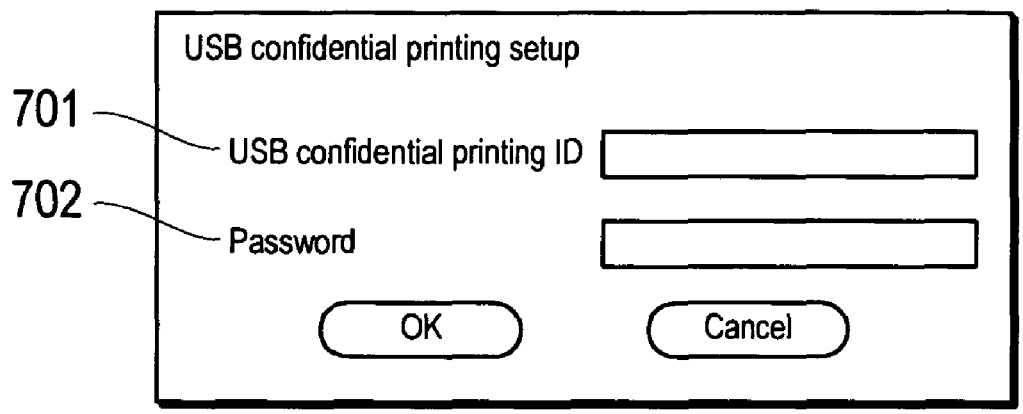
FIG. 17 shows an example of a USB confidential printing setup screen.

When the "USB confidential printing" is selected, the USB confidential printing setup screen 700 is displayed on the display 15 as shown in FIG. 17. The USB confidential printing setup screen 700 includes the input box 701 and 702 for entering the ID and password required for printing, etc.

Figure 18:
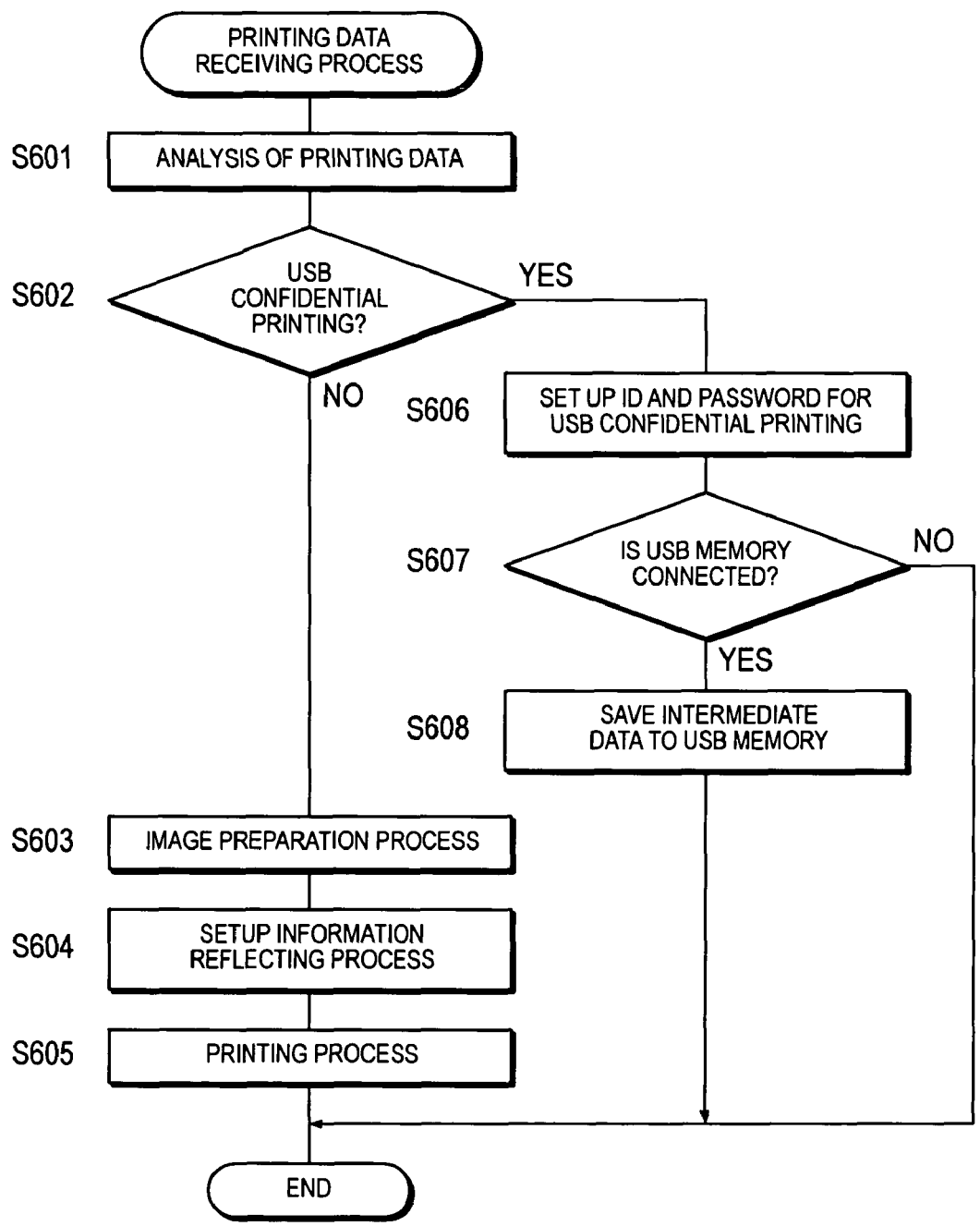
FIG. 18 is a flowchart showing the sequence of the receiving process for the printing data in the printer 2A of the second embodiment.

FIG. 18 is a flowchart showing the sequence of the receiving process for the printing data in the printer 2A of the second embodiment. The algorithm shown in the flowchart of FIG. 18 is stored as a program in a memory unit such as a hard disk 24 of the printer 2A and executed by the CPU 21.

Since the steps S601 through S605 are identical to the steps S201 through S205 in FIG. 8, their descriptions are omitted. However, a judgment is made as to whether the received printing data relates to the "USB confidential printing" or not in the step S602.

If the received data is related to the "USB confidential printing" (S602: Yes), the ID and password to be used in printing and others are set up based on the setup information contained in the printing data.

Next, a confirmation is made as to whether the USB memory 4 is connected to the USB port 32 or not (S607). If the USB memory 4 is not connected (S607: No), the process of FIG. 18 is completed. At this time, a message reporting that the USB memory 4 is not connected is displayed on the operating panel unit 25, or such a report can be sent to the PC 1.

If the USB memory 4 is connected (S302: Yes), the printing data, which is the intermediate data added with the setup information containing the ID and password is written into and stored in the USB memory 4 (S608).

Since the flowchart that shows the sequence of the printing process of the printing data in the USB memory of the printer 2B when the USB memory 4 containing the printing data is removed from the printer 2A and connected to another printer 2B is identical to the flowcharts of FIG. 12 and FIG. 13, so that it is omitted.

As can be seen from the above, the second embodiment provides an effect similar to that of the first embodiment, and the printing data (intermediate data) is written into the USB memory 4 without being stored in the printer 2A so that the process is simpler. Also, this prevents the printing data (intermediate data) from remaining in the printer 2A, so that it is preferable from the security standpoint.

Next, the third embodiment of the invention will be described below.

The first embodiment and the third embodiment are different from each other in that the intermediate data obtained by analyzing the PDL data received from the PC 1 is first stored into the hard disk 24 of the printer 2A in the former, while the PDL data received from the PC 1 is first stored into the hard disk 24 of the printer 2A and the PDL data is converted into the intermediate data before it is written into the USB memory 4 in the latter. The following description will concentrate mainly on those points that are different from the first embodiment.

The flowchart showing the sequence of the transmission process for the printing data in the PC 1 is identical to the flowchart shown in FIG. 5, so that the description is omitted here.

Figure 19:
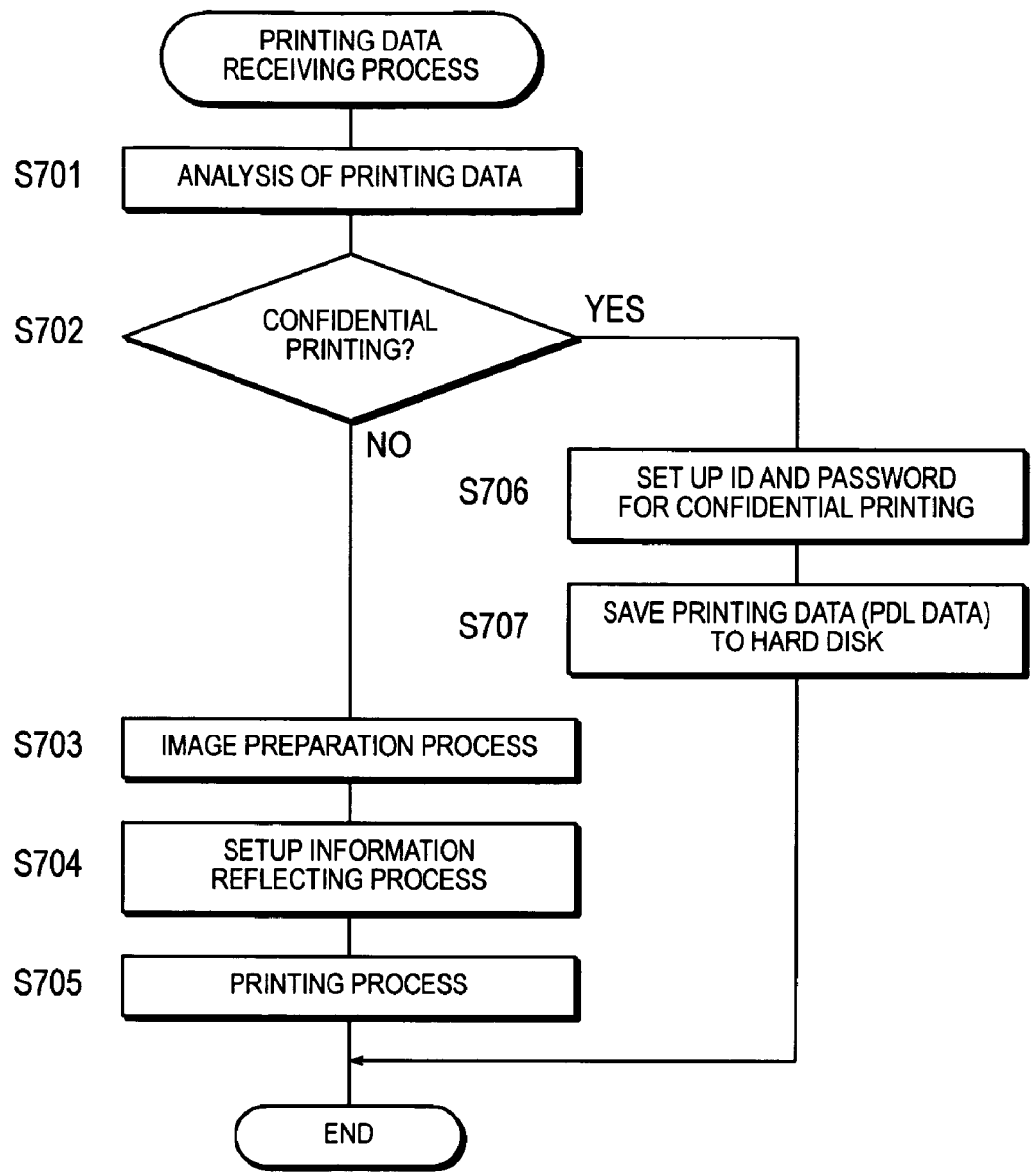
FIG. 19 is a flowchart showing the sequence of the receiving process for the printing data in the printer 2A of a third embodiment of the present invention.

FIG. 19 is a flowchart showing the sequence of the receiving process for the printing data in the printer 2A of the third embodiment. The algorithm shown in the flowchart of FIG. 19 is stored as a program in a memory unit such as a hard disk 24 of the printer 2A and executed by the CPU 21.

Since the steps S701 through S706 are identical to the steps S201 through S206 in FIG. 8, their descriptions are omitted.

The printing data, which is the PDL data now added with the setup information containing the ID and password, is stored into the hard disk 24 in the step S707.

Figure 20:
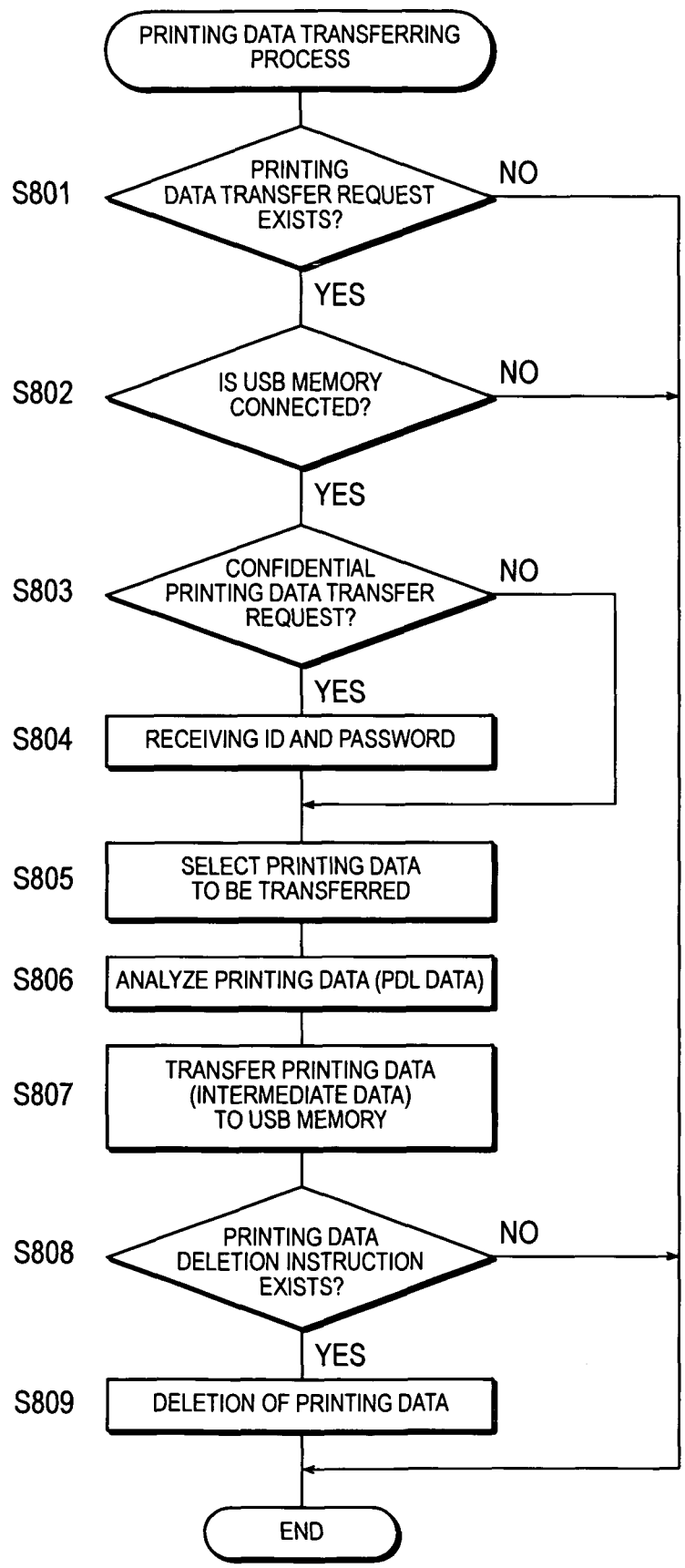
FIG. 20 is a flowchart showing the sequence of the transferring process for the printing data in the printer 2A of the third embodiment.

Next, the process of the transferring process in the printer 2A will be described below with reference to FIG. 20. The algorithm shown in the flowchart of FIG. 20 is stored as a program in a memory unit such as a hard disk 24 of the printer 2A and executed by the CPU 21.

Since the steps S801 through S805 are identical to the steps S301 through S305 in FIG. 9, their descriptions are omitted.

In the step S806, the selected printing data (PDL data) is read out from the hard disk 24 to the RAM 23, and the intermediate data is prepared by analyzing the printing data (PDL data) with the language analysis unit 26. At this time, the setup information containing the ID and pass word contained in the PDL data is added to the intermediate data.

Next, the prepared intermediate data is transferred to the USB memory 4 (S807). In other words, the intermediate data converted from the PDL data is written into the USB memory 4.

Since the steps S808 and S809 are identical to the steps S307 and S308 in FIG. 9, their descriptions are omitted.

Since the flowchart that shows the sequence of the printing process of the printing data in the USB memory of the printer 2B when the USB memory 4 containing the printing data is removed from the printer 2A and connected to another printer 2B is identical to the flowcharts of FIG. 12 and FIG. 13, so that it is omitted.

Consequently, the data format when the printing data received from the PC 1 is first stored in the printer does not have to be limited to the intermediate data but can be the PDL data as shown in the third embodiment. In such a case, a similar effect as in the first embodiment can be achieved.

It is obvious that this invention is not limited to the particular embodiments shown and described above but may be variously changed and modified without departing from the technical concept of this invention.

For example, although the printing data containing the setup information concerning the printing condition is stored in the USB memory in the form of the intermediate data in the embodiments described above, the present invention is not limited to it and it is possible, for example, to have it stored in the USB memory in the form of the PDL data.

Also, although the user selects what the user wants from the printing data stored in the USB memory in the embodiments described above, the present invention is not limited to it. It is also possible to print all the printing data contained in the USB memory when it is in a mode of printing the printing data in the USB memory.

Moreover, although it is described using a USB memory as a portable recording medium that is detachable from the printer in the embodiments described above, the invention is not limited to it. Various recording media such as a SD memory card, removable hard disk, flexible disk, magneto-optical disk, and optical disk can be used in the present invention.

Also, although the embodiments described above use a printer as the image processing/forming device, the invention is not limited to it. Various other devices such as a copying machine and MFP (Multi-Function Peripheral) can be used as well in the present invention.

The means and method of conducting various processes in the image forming device according to the present invention can be realized by means of a dedicated hardware circuit, or a programmed computer. Said program can be provided either by a computer readable recording medium such as a flexible disk and a CD-ROM, or by being supplied on-line via a network such as the Internet. In this case, the program recorded on the computer readable recording medium is normally transferred to and stored in a memory unit such as a hard disk. Said program can also be provided as independent application software or can be built into the software of the image forming device as a part of its function.

What is claimed is:

1. An image forming device, comprising:
   a connecting unit for connecting a recording medium in a removable manner; and
   a writing unit for writing printing data containing setup information concerning a printing condition into said recording medium connected to said connecting unit, wherein said printing data written into said recording medium includes data in an intermediate language format.

2. An image forming device as claimed in claim 1, wherein said printing data is the data obtained after analyzing Page Description Language (PDL) data and contains the data described by said intermediate language before it is developed into bitmap data.

3. An image forming device as claimed in claim 1, wherein said printing data is data concerning a confidential printing and contains a password for allowing an execution of a printing process.

4. An image forming device as claimed in claim 1, further comprising:
   a reading unit for reading printing data stored in said recording medium connected to said connecting unit; and
   a printing unit for executing a printing process based on the printing data read by said reading unit.

5. An image forming device as claimed in claim 1, further comprising a memory unit for saving said printing data, wherein
   said writing unit writes the printing data saved in said memory unit into said recording medium.

6. An image forming device comprising:
   a connecting unit configured to removably connect a recording medium thereto;
   a memory unit configured to save printing data, wherein said printing data saved in said memory unit is Page Description Language (PDL) data and includes setup information concerning a printing condition, and
   a writing unit configured to write the data saved in said memory unit into said recording medium, wherein
   said data is obtained after analyzing said PDL data and contains the data described by an intermediate language before it is developed into bitmap data.

7. An image forming device as claimed in claim 1, wherein said writing unit writes the printing data based on data received from external equipment into said recording medium without saving it into said image forming device.

8. An image forming device as claimed in claim 1, wherein said connecting unit is a USB port, and said recording medium is a USB memory.

9. An image forming method comprising the steps of:
   1) generating printing data containing setup information concerning a printing condition; and
   2) writing said printing data into a recording medium connected in a removable manner to a connecting unit provided in an image forming device, wherein said printing data written into said recording medium includes data in an intermediate language format.

10. A computer readable storage medium stored with an image forming program, wherein said image forming program causes an image forming device to execute a process comprising the steps of:
    storing printing data in an intermediate language format, wherein said printing data contains setup information concerning a printing condition; and
    writing said printing data into a recording medium connected to a connecting unit provided on said image forming device.

11. An image forming method comprising the steps of:
    1) reading out printing data stored in a recording medium connected in a removable manner to a connecting unit provided on an image forming device, which is data obtained after analyzing Page Description Language (PDL) data and contains data described in an intermediate language before it is developed into bitmap data; and
    2) executing a printing process based on the printing data read during said reading step.

12. A non-transitory computer readable storage medium stored with an image forming program, wherein said image forming program causes an image forming device to execute a process comprising the steps of:
    1) reading out printing data, which is recorded in a recording medium connected in a removable manner to a connecting unit provided on said image forming device, obtained after analyzing Page Description Language (PDL) data, and contains data described in an intermediate language before the data is developed into bitmap data; and 2) executing a printing process based on the printing data read during said reading step.

13. An image processing device, comprising:

a connecting unit for connecting a recording medium in a removable manner; and a writing unit for writing printing data into said recording medium connected to said connecting unit, which is data obtained after analyzing Page Description Language (PDL) data and contains data described in an intermediate language before the data is developed into bit map data.

14. An image processing device as claimed in claim 13, wherein:

said printing data is data concerning a confidential printing and contains a password for allowing an execution of a printing process.

15. An image processing device, comprising:

a connecting unit for connecting a recording medium in a removable manner;

a reading unit for reading out printing data, which is recorded in said recording medium connected to said connecting unit, obtained after analyzing Page Description Language (PDL) data, and contains data described in an intermediate language before the data is developed into bitmap data; and a printing unit for executing a printing process based on the printing data read by said reading unit.

16. An image processing device as claimed in claim 15, wherein said printing data is the data concerning a confidential printing and contains a password for allowing an execution of a printing process.

\* \* \* \* \*